US009296067B2

(12) United States Patent
Cathry et al.

(10) Patent No.: US 9,296,067 B2
(45) Date of Patent: Mar. 29, 2016

(54) LASER PROCESSING MACHINE, IN PARTICULAR LASER CUTTING MACHINE, AND METHOD FOR CENTERING A LASER BEAM, IN PARTICULAR A FOCUSED LASER BEAM

(71) Applicant: Bystronic Laser AG, Niederoenz (CH)

(72) Inventors: Daniel Cathry, Roethenbach bei Herzogenbuchsee (CH); Beat Beutler, Oberoenz (CH); Sven Rauschenbach, Lotzwil (CH)

(73) Assignee: Bystronic Laser AG, Niederoenz (CH)

( * ) Notice: Subject to any disclaimer, the term of this patent is extended or adjusted under 35 U.S.C. 154(b) by 423 days.

(21) Appl. No.: 13/952,571

(22) Filed: Jul. 26, 2013

(65) Prior Publication Data

US 2014/0014632 A1 Jan. 16, 2014

Related U.S. Application Data

(63) Continuation of application No. PCT/IB2012/050119, filed on Jan. 10, 2012.

(60) Provisional application No. 61/436,717, filed on Jan. 27, 2011.

(30) Foreign Application Priority Data

Jan. 27, 2011 (EP) ..................................... 11152317

(51) Int. Cl.
*B23K 26/04* (2014.01)
*B23K 26/38* (2014.01)
*B23K 26/14* (2014.01)

(52) U.S. Cl.
CPC .............. *B23K 26/041* (2013.01); *B23K 26/04* (2013.01); *B23K 26/042* (2015.10); *B23K 26/043* (2013.01); *B23K 26/38* (2013.01); *B23K 26/14* (2013.01)

(58) Field of Classification Search
CPC ......... B23K 26/04; B23K 26/14; B23K 26/38
USPC ............... 219/121.6, 121.62, 121.67, 121.72, 219/121.78, 121.83–121.85
See application file for complete search history.

(56) References Cited

U.S. PATENT DOCUMENTS 3,423,593 A 1/1969 Chinnock
3,590,840 A 7/1971 Hyer
(Continued)

FOREIGN PATENT DOCUMENTS

CN 201220326 Y 4/2009
DE 8710866 U1 12/1988
(Continued)

OTHER PUBLICATIONS

Written Opinion of the International Search Authority International Preliminary Report on Patentability, dated May 7, 2012, from parent PCT/IB2012/050119, translated into English translation.
(Continued)

*Primary Examiner* — Samuel M Heinrich
(74) *Attorney, Agent, or Firm* — George Kapsalas; Patentbuero Paul Rosenich AG

(57) ABSTRACT

Laser processing machines (LM), in particular laser cutting machines with long-wave laser radiation (in particular $CO_2$ laser), including at least one laser processing head (1), having interior (2) and nozzle (3) with nozzle orifice (4) for allowing a primary beam (5), in particular a focused laser working beam, to pass through and onto a work piece (6) and to align a gas current enveloping the beam, and an alignment device (15) with several sensors (13) for centering the primary beam (5), in particular a focused laser working beam, and the nozzle orifice (4) relative to each other. At least one conversion unit (9), in particular a conversion edge, is provided in the area of the nozzle orifice (4) for converting the primary beam (5) contacting it or impacting on it into one or more secondary electromagnetic heat beams (10) along at least one propagation direction (10A) in direction of the sensors (13). The sensors (13) are configured as radiation sensors and arranged in the interior (2) of the laser processing head (1) or the nozzle (3).

20 Claims, 7 Drawing Sheets

(56) References Cited

U.S. PATENT DOCUMENTS

| | | | |
|---|---|---|---|
| 3,692,414 A * | 9/1972 | Hosterman | G01S 17/46 250/236 |
| 3,736,402 A | 5/1973 | Mefferd et al. | |
| 3,843,865 A | 10/1974 | Nath | |
| 4,335,296 A | 6/1982 | Bredow | |
| 4,406,940 A | 9/1983 | Tsutsumi | |
| 4,427,873 A | 1/1984 | Orita et al. | |
| 4,634,832 A | 1/1987 | Martyr | |
| 4,644,128 A | 2/1987 | Palentyn et al. | |
| 4,668,088 A | 5/1987 | Quinque et al. | |
| 4,675,501 A | 6/1987 | Klingel | |
| 4,698,480 A | 10/1987 | Klingel | |
| 4,806,726 A | 2/1989 | Rosa et al. | |
| 4,940,880 A | 7/1990 | Klingel et al. | |
| 4,950,861 A | 8/1990 | Erlenmaier et al. | |
| 5,008,510 A | 4/1991 | Koseki | |
| 5,039,836 A | 8/1991 | Lemelson | |
| 5,045,668 A | 9/1991 | Neiheisel et al. | |
| 5,132,510 A | 7/1992 | Klingel et al. | |
| 5,304,773 A * | 4/1994 | Kilian | B23K 26/04 219/121.78 |
| 5,371,336 A | 12/1994 | Albert et al. | |
| 5,373,135 A | 12/1994 | Beyer et al. | |
| 5,463,215 A | 10/1995 | Alfille | |
| 5,491,318 A | 2/1996 | Sugawara et al. | |
| 5,525,776 A | 6/1996 | Okamoto | |
| 5,548,098 A | 8/1996 | Sugawara et al. | |
| 5,667,707 A | 9/1997 | Klingel et al. | |
| 5,685,999 A | 11/1997 | Wiedemann et al. | |
| 5,698,120 A | 12/1997 | Kurosawa et al. | |
| 5,751,436 A | 5/1998 | Kwon et al. | |
| 5,886,319 A | 3/1999 | Preston et al. | |
| 5,915,316 A | 6/1999 | Tajima et al. | |
| 5,968,382 A | 10/1999 | Matsumoto et al. | |
| 5,969,335 A | 10/1999 | Karasaki | |
| 5,998,768 A | 12/1999 | Hunter et al. | |
| 6,044,308 A | 3/2000 | Huissoon | |
| 6,124,565 A | 9/2000 | Morishita et al. | |
| 6,188,041 B1 | 2/2001 | Kim et al. | |
| 6,204,473 B1 | 3/2001 | Legge | |
| 6,260,976 B1 | 7/2001 | Endou et al. | |
| 6,284,999 B1 | 9/2001 | Virtanen et al. | |
| 6,288,363 B1 | 9/2001 | Kaga et al. | |
| 6,300,592 B1 | 10/2001 | Ulrich et al. | |
| 6,316,743 B1 | 11/2001 | Nagahori et al. | |
| 6,326,586 B1 | 12/2001 | Heyerick et al. | |
| 6,376,798 B1 | 4/2002 | Remue et al. | |
| 6,392,192 B1 | 5/2002 | Cole et al. | |
| 6,393,687 B1 | 5/2002 | Friedrich | |
| 6,417,487 B2 | 7/2002 | Nagura et al. | |
| 6,419,146 B1 | 7/2002 | Buldhaupt et al. | |
| 6,455,807 B1 | 9/2002 | Scott | |
| 6,462,301 B1 | 10/2002 | Scott et al. | |
| 6,528,762 B2 | 3/2003 | Mayer | |
| 6,588,738 B1 | 7/2003 | Sukuvaara et al. | |
| 6,649,866 B2 | 11/2003 | Reichmann et al. | |
| 6,670,574 B1 | 12/2003 | Bates et al. | |
| 6,693,256 B2 | 2/2004 | Furujo et al. | |
| 6,777,641 B2 | 8/2004 | Cole et al. | |
| 6,777,646 B2 | 8/2004 | Schubert | |
| 6,822,187 B1 | 11/2004 | Hermann et al. | |
| 6,833,911 B2 | 12/2004 | Lizotte | |
| 6,886,284 B2 | 5/2005 | Lizotte | |
| 6,934,014 B1 | 8/2005 | Kleinhuber | |
| 7,005,606 B2 | 2/2006 | Legge et al. | |
| 7,038,166 B2 | 5/2006 | Denney et al. | |
| 7,060,932 B2 | 6/2006 | Denney et al. | |
| 7,124,420 B2 | 10/2006 | Murata et al. | |
| 7,180,920 B2 | 2/2007 | Denney et al. | |
| 7,286,223 B2 | 10/2007 | Denney et al. | |
| 7,289,206 B2 | 10/2007 | Denney et al. | |
| 7,345,257 B2 | 3/2008 | Yamazaki et al. | |
| 7,379,483 B2 | 5/2008 | Denney et al. | |
| 7,492,453 B2 | 2/2009 | Denney et al. | |
| 7,505,504 B2 | 3/2009 | Sakai et al. | |
| 7,528,344 B2 | 5/2009 | Horn et al. | |
| 7,570,443 B2 | 8/2009 | Blasenheim et al. | |
| 7,620,085 B2 | 11/2009 | Denney et al. | |
| 7,864,315 B2 | 1/2011 | Denney et al. | |
| 7,880,114 B2 | 2/2011 | Denney et al. | |
| 7,880,877 B2 | 2/2011 | Denney et al. | |
| 8,040,619 B2 | 10/2011 | Blasenheim et al. | |
| 8,094,303 B2 | 1/2012 | Denney et al. | |
| 8,217,301 B2 | 7/2012 | Schmauder et al. | |
| 8,228,501 B2 | 7/2012 | Denney et al. | |
| 8,258,425 B2 | 9/2012 | Denney et al. | |
| 8,306,079 B2 | 11/2012 | Denney et al. | |
| 8,314,361 B2 | 11/2012 | Harnisch et al. | |
| 8,383,980 B2 | 2/2013 | Yamazaki et al. | |
| 8,439,811 B2 | 5/2013 | Erlenmaier et al. | |
| 8,519,299 B2 | 8/2013 | Schmauder et al. | |
| 8,624,158 B2 | 1/2014 | Denney et al. | |
| 8,638,509 B2 | 1/2014 | Blasenheim et al. | |
| 2003/0014895 A1 | 1/2003 | Lizotte | |
| 2003/0183608 A1 | 10/2003 | Yamazaki et al. | |
| 2003/0234242 A1 | 12/2003 | McCoy | |
| 2003/0234243 A1 | 12/2003 | McCoy | |
| 2003/0234244 A1 | 12/2003 | McCoy | |
| 2004/0027630 A1 | 2/2004 | Lizotte | |
| 2004/0182839 A1 | 9/2004 | Denney et al. | |
| 2004/0182840 A1 | 9/2004 | Denney et al. | |
| 2004/0182841 A1 | 9/2004 | Denney et al. | |
| 2004/0182842 A1 | 9/2004 | Denney et al. | |
| 2004/0182998 A1 | 9/2004 | Denney et al. | |
| 2004/0182999 A1 | 9/2004 | Denney et al. | |
| 2004/0208212 A1 | 10/2004 | Denney et al. | |
| 2005/0040150 A1 | 2/2005 | Denney et al. | |
| 2005/0051523 A1 | 3/2005 | Legge et al. | |
| 2005/0213881 A1 | 9/2005 | Leclerc et al. | |
| 2006/0144834 A1 | 7/2006 | Denney et al. | |
| 2007/0119829 A1 | 5/2007 | Vietz et al. | |
| 2007/0193988 A1 | 8/2007 | DeVerclos et al. | |
| 2007/0228025 A1 | 10/2007 | Horn et al. | |
| 2008/0031298 A1 | 2/2008 | Sakai et al. | |
| 2008/0067331 A1 | 3/2008 | Denney et al. | |
| 2009/0001063 A1 | 1/2009 | Weick et al. | |
| 2009/0021731 A1 | 1/2009 | Denney et al. | |
| 2009/0057283 A1 | 3/2009 | Schmauder et al. | |
| 2009/0181838 A1 | 7/2009 | Schmauder et al. | |
| 2009/0284739 A1 | 11/2009 | Denney et al. | |
| 2010/0071220 A1 | 3/2010 | Thompson et al. | |
| 2010/0134628 A1 | 6/2010 | Pfitzner et al. | |
| 2010/0188669 A1 | 7/2010 | Rushford | |
| 2011/0102789 A1 | 5/2011 | Denney et al. | |
| 2011/0266262 A1 | 11/2011 | Denney et al. | |
| 2012/0228274 A1 | 9/2012 | Schmauder et al. | |

FOREIGN PATENT DOCUMENTS

| | | |
|---|---|---|
| DE | 4201640 C1 | 2/1993 |
| DE | 10150129 C1 | 4/2003 |
| DE | 102007013623 A1 | 10/2008 |
| DE | 102007048471 A1 | 4/2009 |
| DE | 102009044751 A1 | 6/2010 |
| EP | 0597771 A1 | 5/1994 |
| EP | 0680805 B1 | 1/2001 |
| EP | 1561538 A1 | 8/2005 |
| EP | 1600248 A2 | 11/2005 |
| EP | 1693141 A2 | 8/2006 |
| EP | 1693141 A3 | 7/2008 |
| EP | 1600248 A3 | 10/2008 |
| EP | 2243557 A1 | 10/2010 |
| JP | S56-041092 A | 4/1981 |
| JP | H03-027889 A | 2/1991 |
| JP | H07-144289 A | 6/1995 |
| JP | H09-076084 A | 3/1997 |
| JP | H10-249566 A | 9/1998 |
| JP | H11-077356 A | 3/1999 |
| JP | 2009-129513 A | 6/2009 |
| WO | 2008/052591 A1 | 5/2008 |
| WO | 2011/035888 A1 | 3/2011 |

(56) References Cited

FOREIGN PATENT DOCUMENTS

WO     2012/101533 A1    8/2012
WO     2012/101533 A4    9/2012

OTHER PUBLICATIONS

International Search Report and International Preliminary Report on Patentability, dated May 7, 2012, from parent PCT/IB2012/050119; in German,with partial translation.

EPO Search Report and Written Opinion, from priority appl.No. EP11152317 of the present application; dated Jul. 8, 2011; in German.

EPO Search Report and Written Opinion,dated Dec. 6, 2012, from priority appl.No. EP1217388 of the C-I-P U.S. Appl. No. 13/947,060; in German.

Copending related C-I-P U.S. Appl. No. 13/947,060, filed Jul. 20, 2013.

\* cited by examiner

LASER PROCESSING MACHINE, IN PARTICULAR LASER CUTTING MACHINE, AND METHOD FOR CENTERING A LASER BEAM, IN PARTICULAR A FOCUSED LASER BEAM

This application is a continuation of copending PCT International application no. PCT/IB2012/050119 filed on Jan. 10, 2012 designating the U.S., claiming benefit of priority to prior European application no. EP11152317 filed on Jan. 27, 2011, and also claiming priority as a non-provisional of U.S. provisional application Ser. No. 61/436,717 filed on Jan. 27, 2011, which priority claims are identically applicable to the present application, and parent PCT International application no. PCT/IB2012/050119 is incorporated herein by reference in its entirety and as to all its parts, for all intents and purposes, as if identically set forth in full herein.

The invention relates to a laser processing machine, in particular a laser cutting machine, and a method for centering a, in particular, focused laser working beam in such a laser processing machine.

As known, the laser beam for a cutting process in laser cutting machines shall be guided as centrally as possible through the cutting nozzle of the cutting head. Since a lateral displacement of the optical lenses in the cutting head—caused by a change of lens in the lens insert—can often lead to a displacement of the optical axis, repeated centering of the cutting nozzle is required in practice.

Up to now centering of the nozzle relative to the laser beam in practice has been usually carried out manually. The nozzle is centered by adjusting the nozzle head in X-Y direction relative to the nozzle body by means of adjusting screws followed by fixing. This is done by means of visual control, whereby a transparent adhesive tape is glued on top of the nozzle and a laser pulse is then triggered. The hole thus created should be in the center of the nozzle bore. If this is not the case, the nozzle must then be manually moved relative to the laser beam. This procedure is repeated until the nozzle is exactly centered.

There are also centering methods, where it is not the nozzle which is moved relative to the beam, but where the lens is adjusted relative to the nozzle for focusing the laser beam. The above methods, however, suffer from the following disadvantages:

Due to manual interference and visual assessment centering takes up too much time and also requires practice, accurate visual assessment requires good visual acuity;

Visual interpretation is different with each person; this means that inaccuracy is further increased;

The generated laser pulse is usually low power (e.g. <100 watt) in order to prevent the adhesive tape from burning up completely. This does not correspond to a real cutting operation where power is generated in the kilowatt (KW) range, respectively. This also leads to inaccuracies.

The JP-10249566A has disclosed a laser machine for treatment of the human body, where the luminescence of the axial center of the laser beam is detected by a photo-electric sensor in the area of the focusing lens in the processing head. If the value of the sensor deviates from a required value, the nozzle is adjusted by a device relative to the laser beam.

Accurate and reproducible centering for processing high-quality work pieces using the proposed luminescence measurement is therefore hard to imagine.

The JP-56041092A discloses a laser welding device, the nozzle of which is fitted with external temperature sensors. The device is also equipped with an alignment device for mechanically adjusting the nozzle position relative to the laser beam as a function of measuring signals from external temperature sensors. If the laser beam axis does not coincide with the nozzle axis, the temperature sensors measure different temperatures and send different temperature signals to the alignment device. The temperature differences for the nozzle are minimised due to the centering with the aid of a drive unit of the alignment device.

However, the problem with the known above mentioned device is that the temperature sensors according to the state of the art are practically unable to meet today's requirements, since these temperature sensors which usually comprise thermopiles with a time constant of max. 20 ms are sluggish resulting in centering taking up a relatively long time. This is compounded by the fact that the temperature values recorded by the external temperature sensors are affected by the heat which the work piece emits or reflects. Under such circumstances it is practically impossible to achieve accurate and reproducible centering. On the other hand, it is probable that in the non-centered state of the nozzle—i.e. including during the centering process—given the case that measurements are taken using the above mentioned inert temperature sensors—high heat loads will be encountered at the nozzle for a prolonged time (possibly even including material ablation at the nozzle), which is undesirable.

The DE-102007048471 has disclosed a method for determining the position of a laser beam passing through a nozzle orifice of a laser processing nozzle relative to the orifice. This involves moving the nozzle body and the laser beam relative to each other in propagation direction (Z) of the laser beam, until—as a result of the conical propagation of the laser beam—part of the laser radiation is removed from a marginal area of the laser beam at a special optical dispersion or mirror surface surrounding the orifice. The intensity of the laser radiation reflected and dispersed by the dispersion or mirror surface is then simultaneously detected at a plurality of measuring surfaces and the intensities of the laser radiation detected by the plurality of measuring surfaces are compared for determining the position of the laser beam relative to the nozzle orifice. The part of the laser radiation removed from the marginal area is thus dispersed by diffusion at the dispersion surface or widened and focused at the radially curved mirror surface or at the combined dispersion surface for reflected laser radiation.

The above-mentioned publication also discloses a laser processing nozzle which comprises a nozzle body with a nozzle orifice for allowing the passage of a focused laser beam and a mirror surface formed on the nozzle body and surrounding the orifice, or a combined dispersion/mirror surface for removing a part of the laser radiation from a marginal area of the laser beam. In this case the mirror surface or the combined dispersion/mirror surface is curved in radial direction.

According to the above technology a mirror surface formed on the nozzle body or a combined radially curved dispersion/mirror surface is used for removing a partial laser radiation, and for widening or focusing the reflected partial laser radiation, which therefore requires several complicated optical measures. Contamination of the mirror surfaces may lead to the destruction of the unprotected mirror surfaces in the immediate vicinity of the nozzle since they then no longer act as a mirror, or at any rate to a falsification of the measuring result which according to this state of the art is made up of a simultaneously composed measuring result of all sensors.

The DE-102007013623 (same applicant as with DE-102007048471) further describes an apparatus and a method for aligning a laser beam propagating in Z direction through a nozzle bore defined in the X-Y plane, of a laser processing nozzle on a laser processing head, comprising the following steps:

Activating the laser beam with a defined energy;
Moving the laser beam along a first line in the X-Y plane;
Measuring the radiation in front of the nozzle bore;
Determining, on the first line, first two edge points located on the edge of the nozzle bore by evaluating the measured radiation;
Determining, on the first line, a first target point between the two first edge points and aligning the laser beam with this first target point.

The apparatus comprises sensors for recording a portion of the laser beam reflected by the laser beam through the laser processing nozzle.

With this centering technology therefore the laser beam is to be moved in the X-Y axis initially along a first line and thereafter along a second line, which, however, due to the complicated optical conditions required there as regards the required dispersion of the laser beam at the special optical dispersion surfaces, is cumbersome and requires special measures.

This disclosure relates to an improved laser processing machine and an improved centering method through which the above-mentioned disadvantages of the state of the art can be reduced or eliminated. Due to repeatedly centering the laser processing beam within the nozzle bore of the laser processing head using simpler means without undertaking special optical measures such as mirrors or widening optics etc. for the laser beam, and due to the fact that it can be carried out automatically, the working quality of the machine shall also be increased.

The laser processing machine according to the invention is therefore based on the above-discussed state of the art, i.e. on a laser processing machine which is equipped with at least one laser processing head which comprises an interior space and a laser processing nozzle with a nozzle orifice for aligning a laser working beam with a work piece to be processed. The machine also has an alignment device for centering the laser working beam relative to the nozzle bore which alignment device is equipped with several sensors.

The essence of the laser processing machine according to the invention is seen in that, in the case of insufficient centering of the nozzle orifice relative to the focused primary (laser) beam (first electro-magnetic energy beam), at least one inner conversion unit, in particular a conversion edge, is provided for converting the focused primary (laser) beam into secondary electromagnetic heat radiation for detection by internal radiation sensors able to detect heat radiation in the area of the nozzle bore. The radiation sensors in this case are arranged inside the nozzle or inside the nozzle holder or the working head in order to detect the secondary (electromagnetic) heat radiation.

The radiation sensors are preferably arranged in the inner space of the laser processing head at an axial distance from the laser processing nozzle because this allows a better connection to the control system.

The nozzle may be implemented as a replaceable nozzle if required or, depending on circumstances, as a designated centering nozzle, i.e. as a separate nozzle which may be provided purely for centering purposes which is equipped especially for centering requirements, i.e. with a smaller or larger nozzle orifice or where, for example, the conversion unit or conversion edge is shaped differently or more distinctly than would be desirable for a normal working nozzle.

In one exemplary embodiment of the invention (at least) three or four optical radiation sensors are provided which are distributed in the interior along the circumference of the inner shell surface of the laser processing head, for example in a (usually) horizontal plane normal to the nozzle axis. This arrangement allows for a simple construction but with reliable monitoring.

An embodiment is also feasible, where at least one deflecting reflector is arranged obliquely to the axis of the nozzle in the beam path between the radiation sensors and the conversion edge, for deflecting the secondary heat beam(s) radiating from the conversion edge onto one of (or onto all of) the radiation sensors. With this arrangement the sensors may be disposed approximately radially in the processing head.

According to a further characteristic of the invention the conversion unit according to the invention, in particular the conversion edge, is provided on the inner shell surface of the laser processing nozzle in the vicinity of the nozzle orifice.

Preferably the conversion unit may be implemented as an integral funnel-shaped edge of the laser processing nozzle, which delimits the central nozzle orifice. Or the funnel-shaped conversion unit may be implemented as a separate element shaped as a tapered ring, which is fixed with its central opening in the interior of the laser processing nozzle in its predetermined axial position. The conversion unit may be composed of segments.

In the preferred embodiment the conversion unit, in radial direction (to the nozzle axis), encloses an angle of inclination with the horizontal of approximately 4-8°, preferably 5.0°-5.5°. The angle of inclination is also dependent on the chosen construction, and insofar another angle, for example approx. 45°, could be chosen based on a different construction.

In another embodiment the conversion unit is formed on the inner shell surface of a separate additional centering element, in particular on a separate centering nozzle, which is used as a replacement for the laser processing nozzle during the centering process, and which is attached coaxially, for example by a thread or a fit (with a minimal clearance of e.g. 0.02 mm), or by a quick-release fastener, at the lower end of the laser processing head. Due to this measure the laser processing nozzle can be completely protected against the influences of centering. An embodiment using a fit does not require a rotary movement and insofar is advantageous compared to an embodiment using a thread.

According to a further development feature of the invention the conversion unit is provided with a (possibly metallic) coating for increasing wear resistance and conversion intensity.

In a preferred embodiment the radiation sensors able to detect the heat radiation are implemented as "InGaAs" diodes with wavelengths of approx. 1.0-2 μm for monitoring the converted secondary heat beam. An actually used InGaAs diode can detect radiation of approx. 1-2.6 μm. In measurements carried out with these diodes on an actually realised construction, a radiation of approx. 1-2.2 μm was indeed detected (according to the NIR spectrum).

On the other hand, according to another special embodiment, one or more glass panes may be arranged in front of each radiation sensor, which panes, on the one hand, protect the radiation sensor against contamination and on the other, against damaging $CO_2$ laser radiation (above 10 μm).

In particular, the glass pane may be provided, on one of its side surfaces, with a conversion layer, which converts $CO_2$ laser radiation into heat radiation and allows it to pass to the radiation sensor and/or acts as a reflector for damaging laser radiation. The glass pane thus acts analogously to the conversion unit/conversion edge of the nozzle as a device which converts the $CO_2$ laser radiation into heat radiation of an essentially smaller wavelength (within the NIR range), in order to thereby permit optimal detection by the radiation sensor for detecting heat radiation and to optimally utilise its characteristics for the purpose of centering.

It is convenient if the glass pane is arranged at a distance from the associated optical radiation sensor. Moreover the glass pane and the associated radiation sensor may be arranged in a common holder which can be fixed in a recess of the lower part of the head.

With the centering method according to the invention, a focused primary electromagnetic beam, in particular a laser working beam, may be centered relative to a nozzle orifice of a laser processing head, or a nozzle orifice of a laser processing head is centered relative to a focused primary beam prior or during laser processing in which the above laser processing machine is used.

The essence of the method lies in that the primary electromagnetic beam, in direction of a X-Y coordinate plane defined as normal to the nozzle axis, in particular the laser working beam, radiates as a secondary (electromagnetic) heat beam off an inner conversion unit (metal surface on which the laser working beam occurs and causes local heating) arranged in the area of the nozzle orifice and is detected on the radiation sensors. Each measured value of the radiation sensors ascertained as the secondary heat beam by the conversion unit along the path of the conversion beam is linked with the associated X-Y coordinates of the nozzle axis and the primary beam. Then the respective position of the center of the nozzle orifice relative to that of the primary beam is calculated from the measured values of the optical radiation sensors. Finally, the nozzle orifice is automatically moved relative to the primary beam or the primary electromagnetic beam is moved relative to the center of the nozzle orifice in terms of centering.

The relative displacement between nozzle and laser working beam is triggered by the heat radiation from the inner conversion unit either in three directions offset from one another by 120° or preferably in four axial directions (X+; X−; Y+; Y−).

However, the invention also comprises a construction, where the laser working radiation (>10 μm) is reflected from the conversion edge and then converted in a conversion unit in front of the radiation sensor into a heat radiation of approx. (1-2 μm) and then detected in the radiation sensor able to detect the heat radiation.

According to a further feature of the method aiming of the focused primary beam through the laser processing nozzle with the inner conversion unit (9) is performed from $X_{min}$ to $X_{max}$, wherein the conversion maxima and the intermediate conversion minimum are determined. Then aiming of the focused primary beam through the laser processing nozzle with the inner conversion unit is performed from $Y_{min}$ to $Y_{max}$, and the conversion maxima and the intermediate conversion minimum are determined. For centering the X and Y coordinates of the center of the nozzle orifice are displaced by the X and Y coordinates of the conversion minimum. In this way it is possible to achieve accurate centering of the laser processing beam relative to the nozzle orifice or the nozzle orifice relative to the laser working beam.

The starting point, when carrying out the method, normally is the last stored center. This is the point from which a nozzle edge is aimed at (the order doesn't matter). As soon as a (converted) heat beam (in NIR) is recognised, the control system stores the coordinates. This is repeated in all four axial directions. From this the control system calculates a new center. In order increase the accuracy the above procedure may be repeated. Thereafter the newly determined center is used.

The method may also be performed by placing, not the laser working beam, but a lower-power directional beam than the primary electromagnetic beam into the laser processing beam axis, whereafter this is adjusted relative to the nozzle or the nozzle is analogously adjusted relative to this directional beam. This directional beam, however, must consist of heat radiation or must be able to be converted in the same way as the working laser radiation.

Preferably the method is carried out using the focused primary electromagnetic beam, in particular $CO_2$ laser working beam, with a wavelength of approx. 10.6 μm and converting it in a protective glass in front of the radiation sensors into a secondary heat beam detectable by InGaAs diodes with wavelengths of approx. 1.0-2.2 μm. In another method conversion is carried out by local spot-like heating of the inside surface of the nozzle by means of a laser working beam.

According to the present invention therefore the repeatable and very precise and short-time centering process may be automated using relatively simple means. This is a basic requirement for high-quality laser cutting during which no direction-dependent cutting results may to occur.

The inventive idea consists in that instead of the external temperature sensors and instead of the laser beam impacting upon the work piece, the impact of the focused primary laser beam on the internal conversion unit according to the invention in the vicinity of the nozzle orifice or in front of the radiation sensors generates a secondary beam, in particular a heat beam in the wavelength range of approx. 1-2.2 μm if the laser working beam/nozzle orifice system is in a non-centered state. The inner secondary electromagnetic heat beam generated in this way is thus reliably detected by internal radiation sensors adapted for the detection of heat radiation. In this way the focused primary electromagnetic beam, in particular the $CO_2$ laser working beam, is converted into a secondary NIR conversion beam of 1.0-2.2 μm which is visible for InGaAs diodes.

On the basis of the digital sensor-measured values it is possible for a known CNC system of the machine (main axes) to calculate the center of the nozzle bore in the known manner. However, it is necessary to link the occurrence of the radiation with the exact axis position (X-Y coordinates). The machine is then in a position to quickly and accurately move the nozzle relative to the laser beam or vice versa by means of the alignment device in terms of centering. Or, as known in principle, it is possible, after detecting the heat radiation from the conversion units according to the invention, to merely move the lens in the laser beam in order to align the laser beam relative to the nozzle orifice.

The necessary measures for automatic nozzle centering are as follows:

The secondary conversion radiation (heat radiation) created in a coated (conversion) glass is recorded by internal radiation sensors. This is achieved using a special and novel nozzle design with at least one conversion unit; if required, both the conversion edge and the conversion glass may be present. The important point is that not the $CO_2$ laser radiation, but a secondary heat radiation is detected. This heat radiation can be well and favourably detected due to its spectral components even in a wavelength range being smaller by a power of ten by using known high-resolution and instant-detection InGaAs sensors;

The internal radiation sensors can, for example, be arranged in the interior of the processing head in such a way that they can record the occurring secondary conversion heat radiation;

Laser power during aiming at the centering nozzle is high-power (for example kilowatt range) at best for a short time only, in order to correspond as far as possible to the normal cutting state;

In order not to damage the nozzle due to high laser power, the system must be equipped in such a way, according to a special design, that it is in a position to record the secondary conversion heat radiation as quickly as possible followed by an immediately switch off the primary laser working beam;

The CNC control system of the machine is capable of linking the impact of the secondary conversion radiation with the exact axis position (X-Y coordinates); this means that the signal must be recorded and processed with sufficient speed;

The chosen combination of wavelength conversion of the beam and heat radiation detection by means of radiation sensors adapted to detect heat has proven well in prototypes. The exact physical details leading to the conversion of the beam wavelength in the glass or in the coating are not yet completely clarified; but the assumption is that the molecule structure heats up in places and that this heat radiates through the glass onto the radiation sensor adapted to detect heat.

Aiming the laser working beam at the inner conversion edge is preferably effected sequentially in four axis directions (X+; X−; Y+; Y−), or alternative in three axis directions (for three sensors).

The method according to the invention can be carried out as follows:

The starting point is always the last stored center. Starting from this point a nozzle edge is aimed at by the laser working beam in that the nozzle or the nozzle holder is adjusted relative to the nozzle. As soon as a heat beam is recognised by the one of the sensors, the control system stores the coordinates. This is repeated for all four (or three) axis directions. From this the control system then calculates a new center. In order to increase accuracy the above procedure is preferably repeated. Centers differing from one another after several centering cycles may be interpolated to give an actual center. Only the new center is ultimately used for laser processing.

Further advantages, features and details of the invention are to be found in the description below, in which embodiments are described with reference to the drawings. The features mentioned in the claims and in the description can be essential to the invention either individually or in any given combination.

The list of reference symbols is part of the disclosure.

The figures will now be described in context and overlap one another. Identical symbols refer to identical components, symbols with different indices indicate components which are functionally identical or similar:

Figure 1:
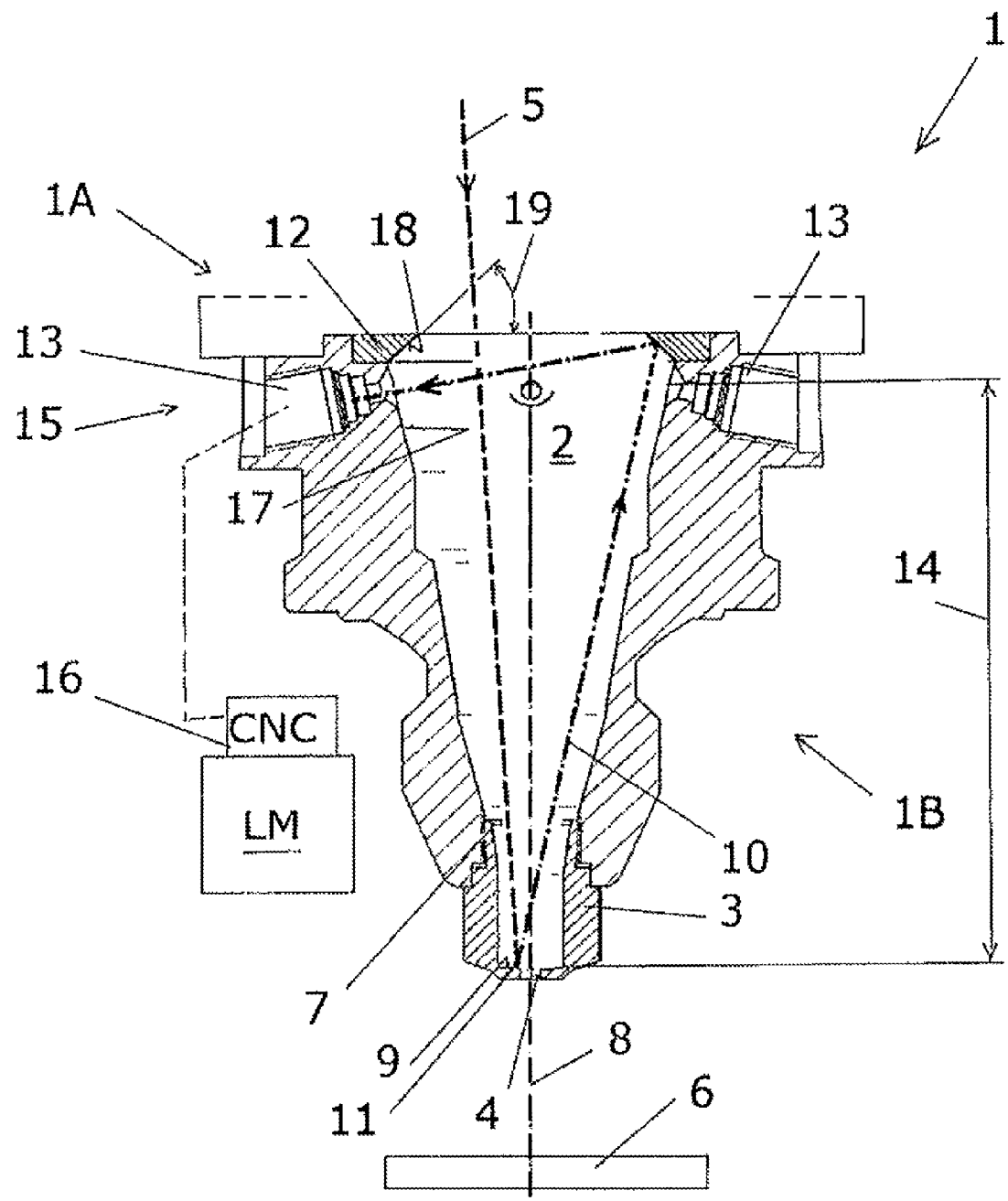
FIG. 1 shows a cross-section of the first exemplary embodiment of the laser processing head of the laser processing machine according to the invention.

FIG. 1 in a first exemplary embodiment shows the construction of a laser processing head 1 which is part of the laser processing machine LM shown schematically as a "black box" only.

The laser processing head 1 of the laser processing machine LM is divided in this case into two parts, i.e. it consists of an upper head portion 1A and a lower head portion 1B which are arranged so as to be movable relative to each other in directions of a X-Y coordinate plane normal to a nozzle axis 8 (such a movable and distributed arrangement of the head is, for example, disclosed in our earlier patent application EP 10170451.8).

The lower head portion 1B has an upwardly widening interior 2 which is delimited at the bottom by a laser processing nozzle 3. The laser processing nozzle 3 is formed with an axial nozzle orifice 4 for directing a primary focused beam, in particular a laser working beam 5 (generated in a manner known as such) onto a work piece 6 to be processed. The laser processing nozzle 3 of FIG. 1 is detachably connected with a head portion 1B by a quick-release closure 7 or a thread or a fit with a minimal 0.02 mm clearance, wherein its nozzle orifice 4 is arranged coaxially to the rotation-symmetric interior 2 of the lower head portion 1B. In FIG. 1 the primary focused electromagnetic beam, in particular laser working beam 5, is shown schematically by a dashed line.

According to the invention at least one internal conversion unit 9 is provided, for example in the form of a conversion edge, in the area of the nozzle orifice 4, which edge, for an insufficient centering of the nozzle orifice 4 relative to the primary focused beam, e.g. laser working beam 5, is designed and arranged to convert the primary focused beam 5 into a secondary electromagnet beam, in particular heat beam 10, along a beam direction 10A (see FIG. 1).

For a greatly eccentric working beam path 10A the primary focused electromagnetic beam 5, in particular laser working beam, cannot be directed through the nozzle orifice 4 onto the work piece 6, but is incident upon the inclined surface of the conversion unit 9 (see impact point 11 in FIG. 1). With the laser processing machine LM according to the invention, the centering necessary in this case can be carried out relatively simply, quickly and automatically and with high resolution.

The conversion unit 9, for example conversion edge in the first exemplary embodiment, is inclined such (see FIGS. 1 and 2) that the secondary electromagnetic beam, in particular heat beam 10, is guided exactly along the beam direction 10A shown by the dashed line in FIG. 1 onto a reflector 12 and, after conversion at this reflector 12, is recorded by a radiation sensor 13 able and adapted to detect heat.

The radiation sensors 13 which monitor the secondary heat beam 10 at the end of its beam path along the chain-dotted beam direction 10A, are preferably arranged recessed at an axial distance 14 from the conversion unit 9 and the wall of the interior 2.

The radiation sensors 13 belong to an alignment device 15 which is suitable for moving the lower head portion 1B together with the nozzle orifice 4 relative to the primary beam, in particular laser working beam 5, i.e. for centering it. To this end the alignment device 15 is equipped with known drives (main axes of the machine not shown), which permit adjustments at least in X-Y axis directions. (Such alignment devices 15 are known in more detail from the JP-56041092 or the EP-10170451.8; these are hereby incorporated in the present disclosure for reference.

The radiation sensors 13 of the alignment device 15 supply measured signals to a CNC system 16 (main axes) known as such, of the laser processing machine LM (FIG. 1).

During centering the primary focused beam, in particular laser working beam 5, is preferably aimed at the laser processing nozzle 3 in four axis directions X+ and X−, as well as Y+ and Y− (if only three sensors 13 are present, the movement would be carried out in three directions only, offset relative to one another by 120°). The primary beam 5 is thus moved relative to the laser processing nozzle 3 in all four direction +/−X and +/−Y, until the primary beam 5, in particular laser working beam 5, is respectively reflected at the oblique edge of the conversion unit 9 of the laser processing nozzle 3 as the secondary beam, in particular reflection beam, i.e. heat beam 10 along the above-described heat beam path 10A. At the end thereof the secondary beam, in particular heat beam 10, is detected by the optical radiation sensors 13 which are adapted to detect heat radiation, and the measured values thereof are stored. These stored measured values must, however, be linked with the exact axis position (coordinates X-Y). This means that the radiation sensors 13 generate data only for the control system. However, this also stores the coordinates. When storing this data therefore, the coordinates are included in it. Thus it is possible for the CNC system 16 to calculate the center of the nozzle orifice 4 for a given non-centered state as a centered required position.

Then automatic nozzle centering as such can be carried out by means of moving the head portion 1B relative to the head portion 1A in directions of the X-Y axes by operating the alignment device. When the above fully automatic nozzle centering process is repeated several times in all signed directions of the X-Y plane, the center of the nozzle orifice 4 can be moved quickly, systematically and accurately into the primary beam 5, in particular laser working beam, by the laser processing machine LM.

For this embodiment of the invention it is provided that the laser processing head 1 is adjustable with the aid of the drives of the alignment device 15 in the X-Y plane. Measuring the centered position of the laser processing nozzle 4 can be carried out for example as follows:

Start at $X_{min}$, followed by a movement to $X_{max}$. In between lies a heat beam maximum and a heat beam minimum. The heat beam minimum indicates the ideal centering in X direction, and the computer remembers this;

Then comes a start at $Y_{min}$ followed by a movement to $Y_{max}$. In between lies again a heat beam maximum and a heat beam minimum. The heat beam minimum indicates the ideal centering in Y direction, and the computer remembers this;

a computer (of the CNC system) then brings the X and Y axes exactly into the heat beam minimum positions of X and Y, whereby ideal centering has been achieved.

The important thing is that the centering system according to the invention is not based—as in the cited prior art—upon reflection and absorption of the laser working beam and upon temperature measurement at the work piece below the nozzle. Rather, according to the invention, optical radiation sensors 13 are provided, which are arranged inside the laser processing head 1 below (or above if required) the focusing optics (not shown), but in any case distinctly above the laser processing nozzle 3 and not on the nozzle or in the nozzle. This allows the signals generated with the aid of the primary beam 5, in particular laser working beam, i.e. the signals generated through the secondary heat beam 10 by the radiation sensors 13 and then transmitted to be recorded quickly, precisely and reproducibly.

In the embodiment of FIG. 1 four optical radiation sensors 13 are provided which are adapted to detect heat radiation and are evenly distributed (in a ring-like fashion if required) in the interior 2 along the circumference of an inner shell surface 17 of the laser processing head 1 in a plane parallel to the X-Y plane (only two are illustrated in FIG. 1). If required, more than four (or fewer, for example three) optical radiation sensors 13 may be convenient.

As already mentioned above, in FIG. 1 the reflector 12 for deflecting/redirecting the secondary beam 10 created in the conversion unit 9, in particular heat beam, is arranged in direction of the radiation sensors 13 along the V-shaped beam propagation direction 10A between the conversion unit 9 and the radiation sensors 13. The reflector 12, in the first exemplary embodiment, comprises a conical reflection surface 18. In radial direction this encloses an angle 19 with the horizontal, the value of which is preferably about 45°.

The ring-shaped reflector 12 in FIG. 1 is fixed coaxially and detachably in the upper area of the lower head portion 1B as a ring element. If required, the reflector 12 could be formed of several parts, e.g. segments (not shown). In a typical embodiment it is simply formed on the inner wall of the nozzle.

Figure 2:
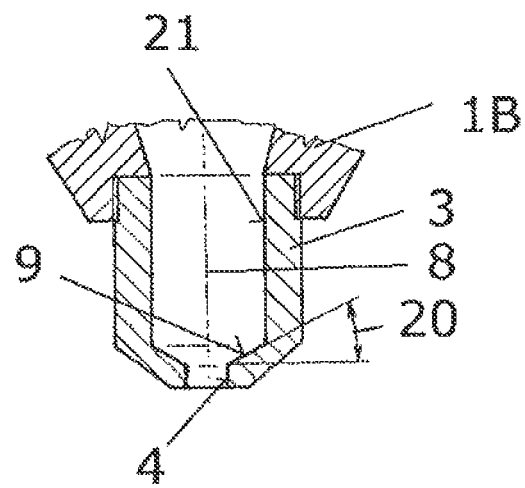
FIG. 2 shows a cross-section of a laser processing nozzle modified relative to FIG. 1 with a conversion edge according to the invention in the immediate vicinity of the nozzle orifice.
Figure 3:
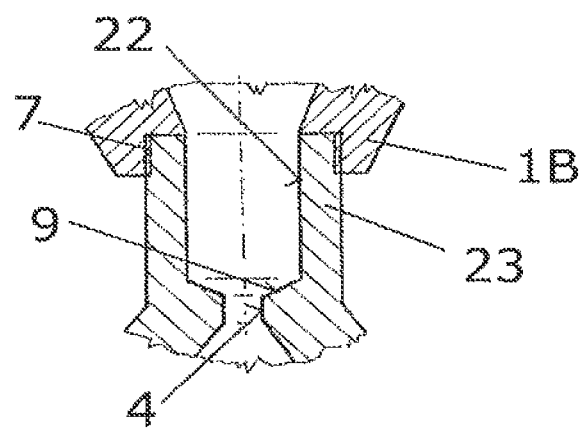
FIG. 3 shows a cross-section of an additional centering element replacing the laser processing nozzle during the centering process, with a fitted conversion edge according to the invention.

In FIG. 2 it can be seen that the conversion unit 9—viewed in radial direction—encloses an angle of inclination 20 with the horizontal, the value of which was chosen in our experiments to be 4-7°, preferably approx. 5.0°-5.5° (as already pointed out, other angles may be chosen depending upon the construction). In FIGS. 2 and 3 the conversion unit 9 is formed as an integrated radial, conical-ring-shaped edge of the laser processing nozzle 3, which delimits the nozzle orifice 4 and is manufactured of copper, for example. This permits a simple implementation. But it should be emphasised that the conversion unit 9 with (or without) nozzle orifice 4 could be implemented as a separate element, which can be fixed in its predetermined axial position (not shown) on one inner shell surface 21 of the laser processing nozzle 3. Another possible implementation would be where the conversion unit is composed of several conversion parts, for example radial conversion segments (not shown).

In terms of the invention, however, the conversion unit 9 need not be necessarily provided in the laser processing nozzle 3 itself (see FIGS. 1-2). In FIG. 3 a further possible embodiment is illustrated, wherein the conversion unit 9 is formed on an inner shell surface 22 of a separate additional centering element, in particular centering nozzle 23, which replaces the laser processing nozzle 3 during the centering process, e.g. prior to normal machine operation. After removing the laser processing nozzle 3 the centering element 23 is coaxially arranged at the lower end of the laser processing head 1 and detachably fixed by a quick-release closure 7. By using the additional centering element 23 the laser processing nozzle 3 can be completely protected even against small detrimental effects of the centering process.

Figure 4:
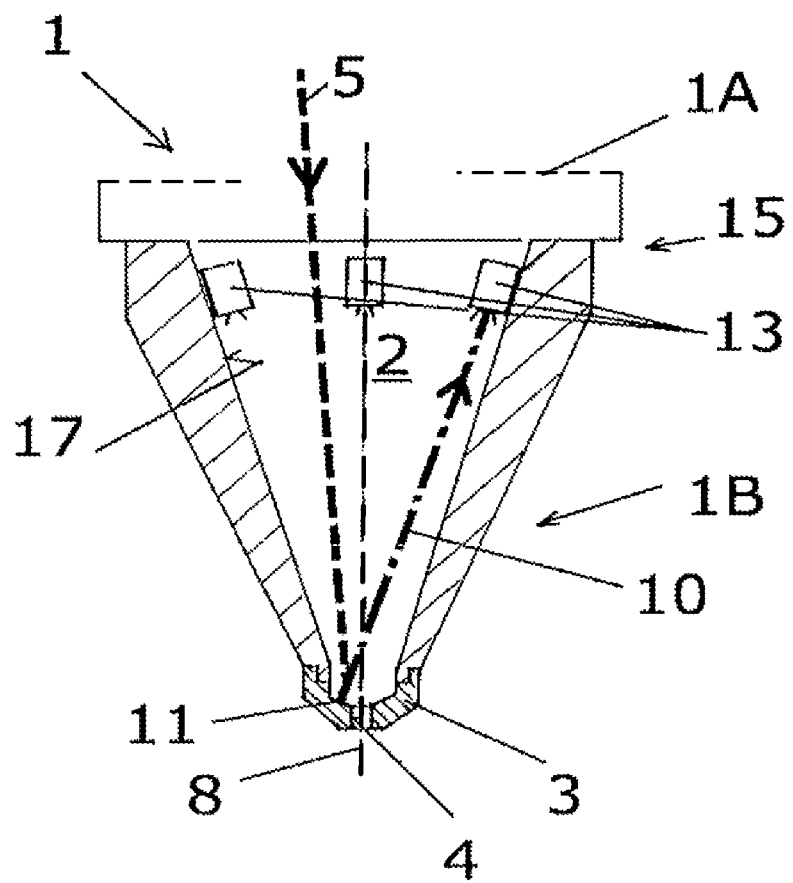
FIG. 4 shows a schematic drawing of a second exemplary embodiment of the laser processing head according to the invention.

In FIG. 4 a second, constructionally simpler exemplary embodiment of the laser processing head 1 according to the invention is schematically shown. An essential difference to the first embodiment of FIG. 1 consists in that the propagation direction 10A of the secondary heat beam 10 does not lead via a reflector, but directly to one of the optical radiation sensors 13. The reflector has been omitted here. The optical radiation sensors 13 are evenly distributed in the interior 2 along the circumference of the inner shell surface 17 of the laser processing head 1, for example in a plane parallel to the X-Y plane, and orientated downwards (see FIG. 4) such that they can directly detect the secondary beam 10 created on the conversion unit 9 via its propagation direction 10A. This permits an even faster, more precise and more reproducible recording of the measured values via heat radiation.

According to the method according to the invention, in order to center a focused primary beam, in particular laser working beam 5, the primary electromagnetic beam, in particular laser working beam 5, moved prior or during a laser working operation relative to the nozzle orifice 4 of the laser processing head 1 (or vice versa), in directions of a X-Y coordinate plane defined as a plane normal to a nozzle axis, is directed following its propagation direction 10A by an inner conversion unit 9 arranged in the area of the nozzle orifice 4 onto the heat radiation sensors 13 as a secondary electromagnetic beam, in particular heat beam 10. Each value measured by the radiation sensors 13 which is ascertained by the secondary heat beam 10 from the conversion unit 9 along the propagation direction 10A, is linked with the associated X-Y coordinates of the nozzle axis 8 and the primary beam, in particular laser working beam 5. Then the respective position of the center of the nozzle orifice 4 relative to that of the primary beam 5 is calculated from the measured values of the radiation sensors 13, and the nozzle orifice 4 is automatically moved accordingly relative to the primary beam 5, or the primary electromagnetic beam 5 is automatically moved relative to the center of the nozzle orifice 4 in terms of centering.

The following are examples from diverse measurements taken. The starting conditions for the centering process are as follows:

For a nozzle 3 eccentrically positioned by 0.35 mm in X-minus direction the heat beams converted from the pulsed laser working beam were visible on the optical radiation sensor 13 for detecting heat radiation;

For a nozzle 3 eccentrically positioned by 0.4 mm in X-minus direction strong signals occurred on the radiation sensor 13.

In order to increase centering accuracy as proposed by the invention, the signal should rise as evenly if possible (especially in + and − direction per axis) and the signal must be clearly recognisable. According to the invention this was achieved, for example, with the following test parameters for the control system:

Detection feed rate: 200 mm/min
Level: 10 billion
Laser power 3 kW
The rise from basic noise to triggering the switch-off signal (10 billion) amounted to between 1 and 3 ms. The signal continued to rise, since switch-off was not possible until the level was recognised and a predetermined delay for switch-off had elapsed, and because localised heating has to decay first, which in principle happens quickly because the nozzle usually consists of copper and therefore acts as a good heat conductor.

The term "level" is understood in practice to mean a threshold value in the control system of the CNC system 16 of the machine LM, which decides whether the signal was recognised by one of the radiation sensors 13 or not. The secondary electromagnetic beam, in particular heat beam 10 created at the conversion unit 9 is incident along its propagation direction 10A upon the radiation sensor 13 (for example a InGaAs diode). The latter, depending upon the intensity of the radiation, generates a voltage signal which it then processes further using suitable electronics of the CNC system 16 in a manner known as such.

When using the above electronics values from 0 (no reflected radiation) to 2 billion units (saturated diode) were measured. If a level of e.g. 10 billion units is exceeded, this is a basis for deciding on the immediate switch-off of the laser power. Exactly at this point in time the X and Y axis positions are also stored. Thus it is known, where the nozzle orifice center (nozzle axis 8) now lies.

To carry out automatic centering according to the invention, the following settings should for example be kept in the CNC control system of the machine:

Detection feed rate: typically 50-200 mm/min;
Detection power: typically 1-2 kilowatt;
Gas type: for example $N_2$ (nitrogen);
Gas pressure: typically 1 bar;
Detection level "signal recognised" at the sensor: typically 2 billion (units).

Figure 5:
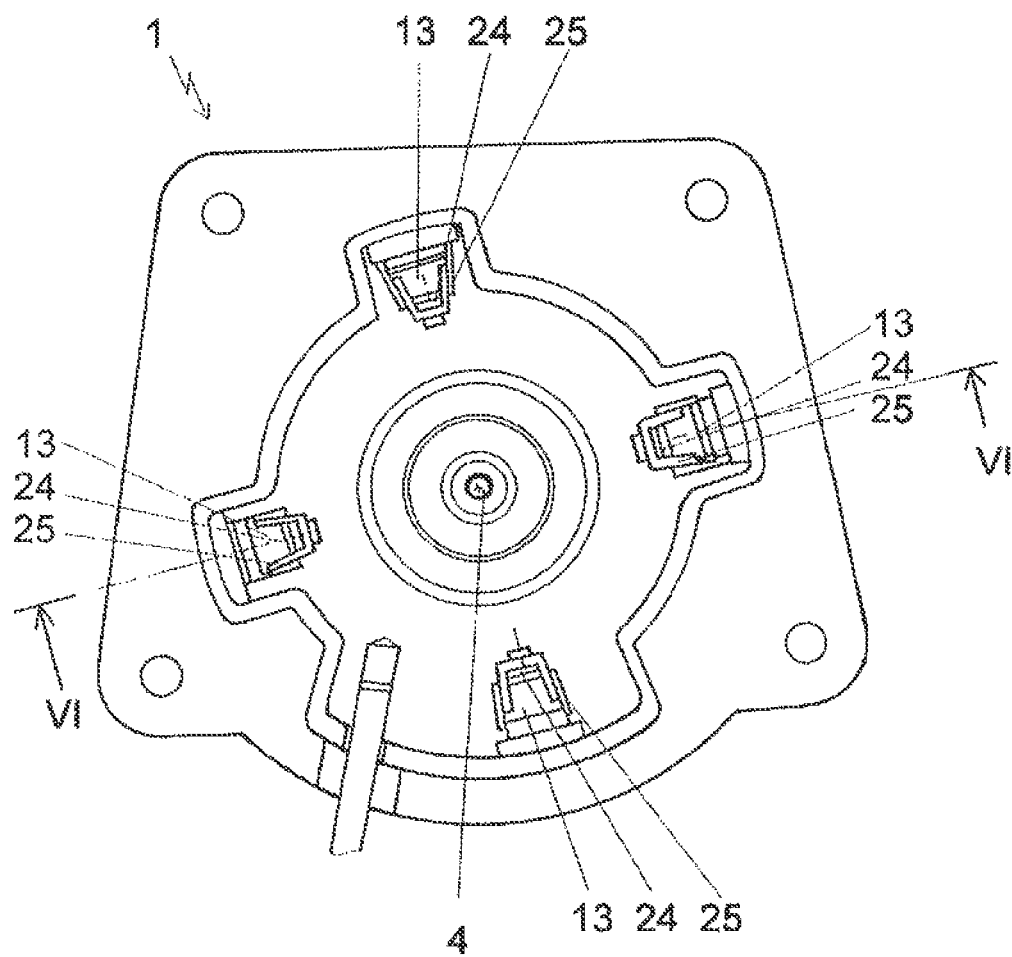
FIG. 5 shows a top view of a third exemplary embodiment of the laser processing head according to the invention.
Figure 6:
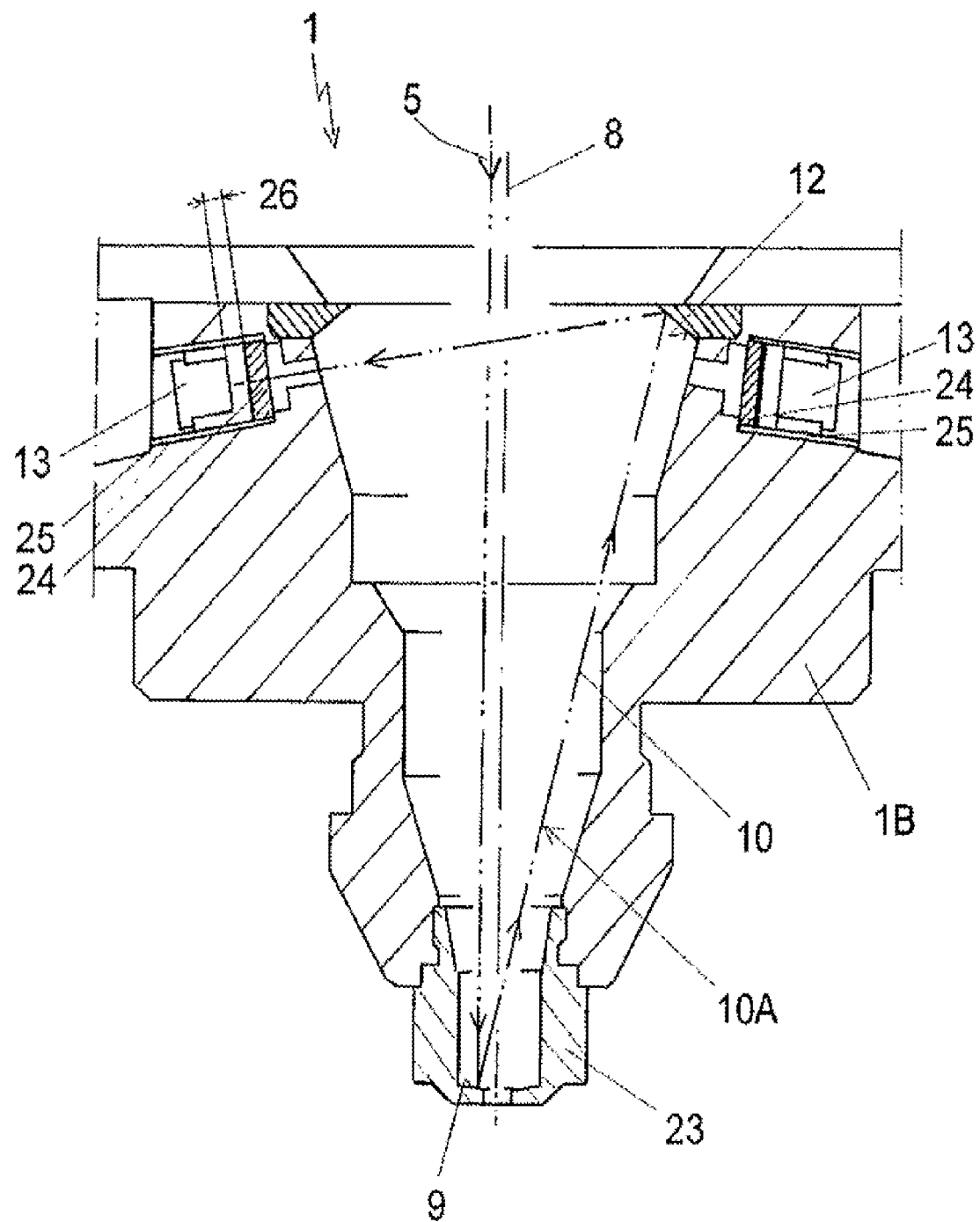
FIG. 6 shows a section along line VI-VI in FIG. 5.

FIGS. 5 and 6 show the preferred third exemplary embodiment of the laser processing head 1 of the laser cutting machine. In essence this solution corresponds to the embodiment depicted in FIG. 1 (identical or equivalent details have been marked with the same reference symbols), save for the type and the arrangement of the radiation sensors 13. Here InGaAs diodes have been used as optical radiation sensors 13.

From practice it is, however, known that the known InGaAs diodes are practically unable to detect $CO_2$ laser radiation with a wavelength of 10.6 μm. Therefore the inventive activity is seen in the fact that the focused primary $CO_2$ laser working beam 5 with a wavelength of 10.6 μm is converted into broadband NIR (near infrared) radiation already visible for the InGaAs diodes, in other words, infrared radiation with wavelengths of approx. 1.0-2.2 μm, which according to the invention can be detected without problems as a secondary electromagnetic heat beam 10.

As shown in FIGS. 5 and 6, four InGaAs radiation sensors 13 have been arranged in radial direction in the interior 2 at approx. 85° to the nozzle axis 8. A conversion unit, e.g. conversion edge 9 of a centering nozzle 23 is inclined such that the converted and reflected secondary conversion beam 10 is directed along a V-shaped propagation direction 10A to a reflector 12, and after reflection at this reflector 12, is recorded by a radiation sensor 13.

Each of the InGaAs radiation sensors 13 is preferably associated with at least one glass pattern, in particular a glass pane 24, which on one face is provided with a HR-coating (high reflectivity coating for long-wave radiation, in particular $CO_2$ laser radiation) (the coating itself is not shown in FIG. 6). The coated glass panes 24 are produced in this case from a commonly used $SiO_2$ glass.

Figure 7:
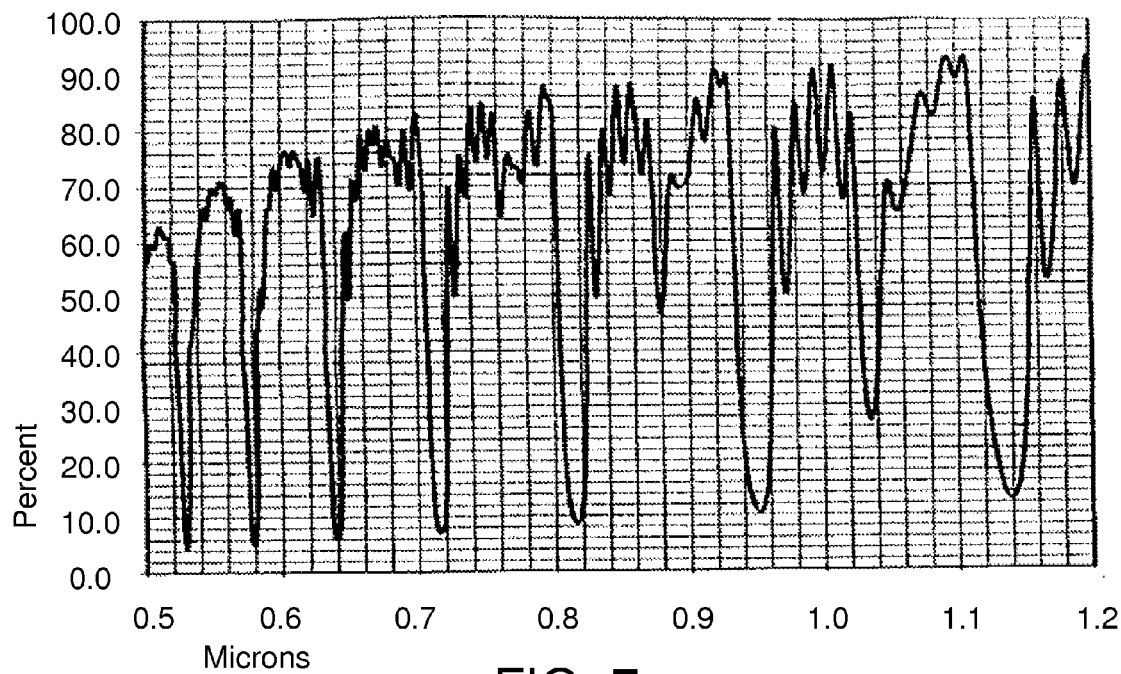
FIG. 7 shows a diagram of the light transmittance at the coated glass pane according to FIG. 6 between secondary beam wavelengths of 0.5 and 1.2 microns.
Figure 8:
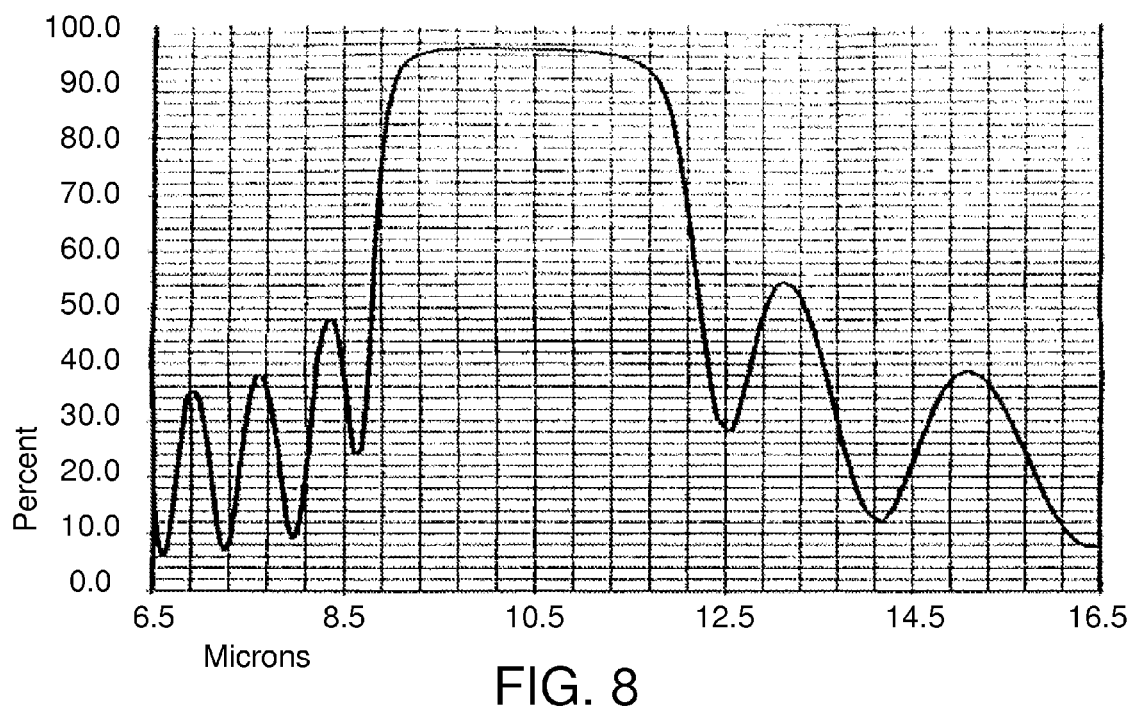
FIG. 8 shows a diagram of the reflection effect of the coated glass pane according to FIG. 6 between wavelengths of 6.6 and 16.6 microns.

FIG. 7 depicts the light transmittance diagram (in %) of the coated glass pane 24 of FIG. 6, wherein one face of the glass pane 24 is provided with a HR-coating. FIG. 8 shows a reflection diagram (in %) of the coated glass pane 24, wherein only the first face of the glass pane 24 is provided with a HR-coating. These diagrams are from the manufacturer). One could imagine that both faces of the glass pane 24 are provided with a coating of this kind.

As will be recognised in FIGS. 7 and 8, approx. 70% transmission (max. visible light, min. laser light) and 95% reflectivity of the 10.6 μm primary laser radiation are achieved through the coated glass pane.

Each glass pane 24 in the exemplary embodiment of FIG. 6 is arranged in front of the associated InGaAs radiation sensor 13, conveniently at a distance 26 and preferably in a common holder 25. Each removable holder 25—together with the fitted InGaAs radiation sensor 13 and glass pane 24—is fixed in a recess 27 of the lower head portion 1B (FIG. 6).

With automatic nozzle centering in the embodiment of FIGS. 5 and 6 the centering nozzle 23 is moved relative to the focused primary beam, in particular laser working beam 5, along a X or Y axis direction, until one of the InGaAs radiation sensors 13 has reached a defined level. The four InGaAs radiation sensors 13 are thus exclusively illuminated by the electromagnetic radiation due to the +/−X and +/−Y movements of the cutting head, i.e. the laser beam is moved in +X axial direction, the laser radiation is reflected from the nozzle edge and is incident, in converted form (NIR), on the InGaAs diode(s) via a mirror in the cutting head, through a filter and the glass plane 24.

As soon as the sum of the intensities of all four InGaAs diodes exceeds a certain value, the primary laser beam 5 switches off. If this is done in all four X and Y axial directions, the mutual position of the primary laser working beam 5 and the laser processing nozzle 3 or the centering nozzle 23 may be ascertained, thus allowing the laser processing nozzle 3 or the centering nozzle 23 to be centered quickly, reliably and repeatably.

Figure 9:
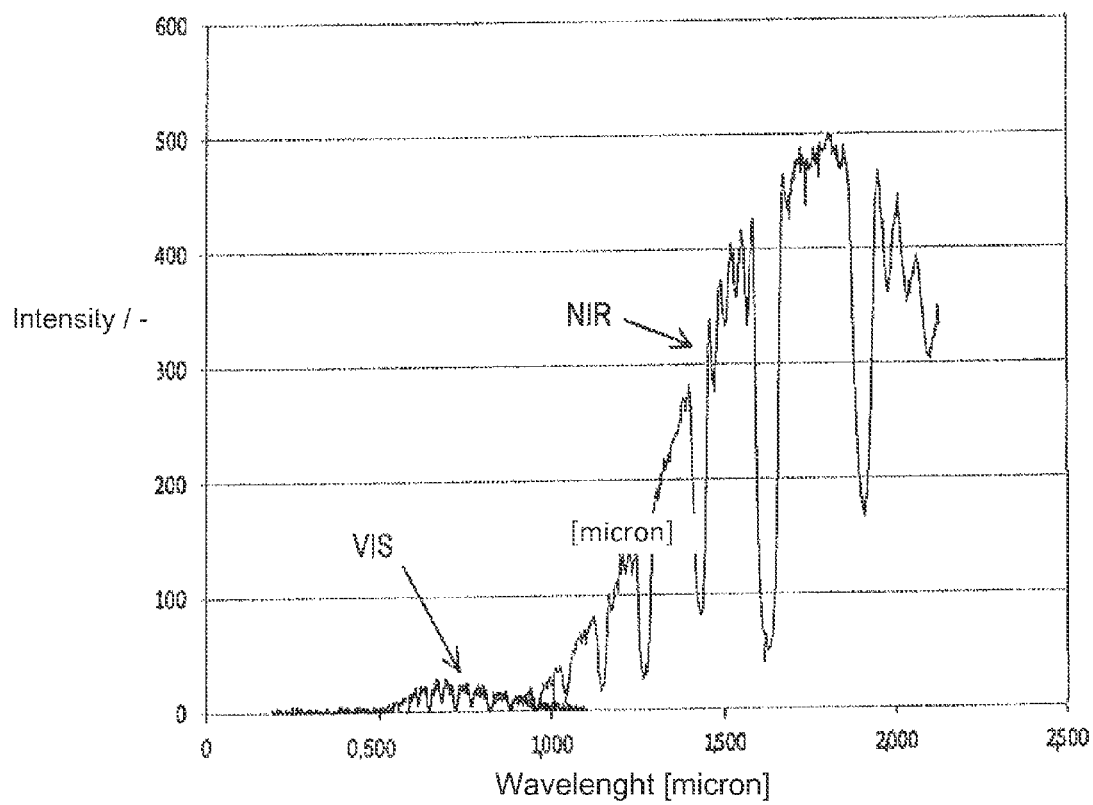
FIG. 9 shows a diagram of the spectrum of light of the primary beam at the protective glass pane with HR (high reflection) coating according to FIG. 6.

Based on our previous experiments it could be ascertained that the feature according to the invention, according to which the focused primary $CO_2$ laser working beam 5 (10.6 µm) is converted into broadband NIR radiation (infrared radiation as per definition according to ISO 20473 0.78-3.0 µm) visible for the optical InGaAs radiation sensors 13, which according to the invention can be detected without interference as a secondary conversion beam or heat beam 10, can be regarded as a proven fact (by means of the diagram in FIG. 9, wherein the right-hand curve illustrates the NIR radiation (of 1.0-2.2 µm). The spectrum which we actually recorded shows on the right-hand NIR line that laser light of 10.6 µm according to the coated glass pattern is transformed into a radiation of approx. 1.0-2.2 µm. (The VIS line on the left-hand side stems from visible light which due to the measuring layout is present in front of the coated glass and is not part of the heat radiation or the converted secondary beam. This VIS line is therefore not related to the invention, but merely confirms that the glass we used allows the transmittance of visible light.)

This can be explained based on the following deliberations, i.e. the converted secondary conversion beam 10 (of approx. 1.0-2.2 µm) could stem from:

a) a "heat radiation" which stems from a material present in the conversion unit and absorbing primary $CO_2$ laser radiation. Other possibilities could be the copper nozzle 3 and 23, the brass nozzle body or the aluminium InGaAs diode holder 25 and/or b) a "heat radiation" which arises after the absorption of the focused primary $CO_2$ laser beam 5 in the coated glass pane 24 in front of the InGaAs radiation sensor 13, and/or c) a part of the $CO_2$ laser beam 5 which after conversion reaches the InGaAs radiation sensor 13 as a secondary electromagnetic heat beam 10.

Essential differences with regard to the cited DE102007048471A:

According to the present invention the system does not compare the intensities of the sensors in order to ascertain the center of the beam (as in the cited publication), but has an empirically determined "abort criterion" (i.e. as soon as the sum of the intensities of all four radiation sensors 13 exceeds a certain value), which tells the system that it is now at the conversion unit 9 (at the nozzle edge). With the invention, no movement in direction of the Z axis takes place, only movements in X-Y direction, and special dispersion surfaces (as in the cited publication) are not required, which means that the present invention is not dependent upon mirror quality.

In our experiments with a the prototypes of the laser cutting machine LM according to the invention the following positive effects were found:

The reflected or converted laser working beams were easily and precisely measurable for a focal length of approx. 3.75-7.5 inch (95-190 mm);

In order to ascertain details on the wear resistance of the laser processing nozzle 3 approx. 2000 centering cycles were performed on the same conversion unit 9 and the signals recorded, and the geometry of the conversion unit 9 and of the nozzle 3 were observed: Result: Based on the measuring results no wear could be detected neither on the conversion unit 9 nor on the nozzle 3.

The essential advantages achievable with automatic nozzle centering according to the invention are as follows:

Centering of the nozzle is much easier, quicker and more accurate than with the state of the art;

The nozzle centering process is practically free from wear and reproducible;

The quick response permits a centering process with high laser power (kw range), since the primary laser working beam 5 is switched off very quickly as soon as the measuring signal recorded through beam conversion exceeds a certain predetermined value. The nozzle 3 and the conversion unit 9 therefore remain wear-free, even for such high laser power;

Quick switch-off of the laser beam means that the reaction time beginning with detecting the beam at the conversion unit 9 up to the "laser off" command is not tied to the otherwise usual cycle time of the CNC system of 16-20 ms, but happens immediately as per quick interrupt signal, i.e. within microseconds (e.g. 100 µm). Thanks to this quick switch-off of the laser working beam 5 the nozzle and the conversion unit 9 experience only localised and short-time heating-up. The undesirable heat loads of the nozzle, as they can occur with the state of the art, are thus eliminated;

If the conversion unit 9 at the nozzle orifice 4 is moved relative to the laser working beam 5 (or vice versa), the laser working beam 5, starting with the time of its reflection or conversion at the conversion unit 9, generates a measuring signal at the radiation sensor 13, wherein the control system of the machine LLM switches the laser off in good time in order to avoid any damage to the nozzle 3 and the conversion unit 9;

The at least three optical radiation sensors 13 are not arranged on the wear part (nozzle), but at a relative distance therefrom on the laser processing head 1. This makes this invention, in contrast to the known solutions, suitable for industrial use;

In order to ensure a standardised deflection of the laser working beam 5 reflected and converted at the conversion unit 9 in direction of the optical radiation sensors 13, a conversion unit 9 with the defined angle of inclination 20 is necessary;

Due to the invention reliability of production and work quality of the laser processing machine LM can be considerably increased.

It should, however, be noted that no conversion coating on the conversion unit 9 was used in the embodiments of FIG. 1 or FIG. 4. It may however be convenient, in order to further increase wear resistance and conversion intensity, to provide the conversion unit 9 with a coating.

Further embodiments of the laser processing machine LM according to the invention and its combinations for which an expert in the art with knowledge of the present invention would not need any further technical teaching, are feasible in terms of the attached patent claims.

LIST OF REFERENCE LABELS

LM laser processing machine/laser cutting machine
1 laser processing head in terms of this application only means the nozzle body incl. sensor system and nozzle. A complete laser processing head also includes the focusing optics/lens and further mechanics which, however, are secondary to the invention as such and not shown in any of the figures
1A upper head portion
1B lower head portion
2 interior
3 laser processing nozzle
4 nozzle orifice
5 primary focused electromagnetic beam/laser processing beam
6 work piece (to be processed)
7 quick-release closure or thread or fit
8 nozzle axis
9 conversion unit/conversion edge
10 secondary electromagnetic beam/heat beam
10A propagation direction of secondary heat beam
11 point of impact
12 heat beam reflector
13 radiation sensor
14 distance
15 alignment device
16 CNC system
17 inner shell surface (of the head)
18 reflection surface
19 angle
20 angle of inclination
21 inner shell surface (of the nozzle)
22 inner shell surface (of the centering element)
23 additional centering element/ centering nozzle
24 coated glass pane as second conversion unit
25 holder for glass pane and radiation sensor
26 distance
27 recess

What is claimed is:

1. A laser processing machine comprising:
a laser processing head, said laser processing head having an interior, said interior having an interior wall, said interior wall being disposed about a central axis;
a nozzle associated with said laser processing head, said nozzle having a nozzle orifice for a primary focused laser beam;
a beam centering arrangement including a plurality of sensors;
a conversion edge provided in the area of said nozzle orifice to convert at incidence the primary laser beam into at least one secondary electromagnetic heat beam respectively directed along at least one propagation direction towards said plurality of sensors; and,
said plurality of sensors each having at least one respective glass pane provided with a reflective coating reflective relative to the primary laser beam, each said respective glass pane converting long-wave IR of the primary laser beam into short-wave IR of the secondary electromagnetic heat beam, said plurality of sensors being NIR heat radiation sensors including InGaAs diodes and being arranged to view through respective openings in said interior wall of said laser processing head.

2. A laser processing machine as claimed in claim 1, further comprising:
said plurality of sensors being evenly distributed around a circumference of said interior wall; and,
each of said respective view openings has a respective center, said plurality of respective view opening centers being arranged in a plane normal to said central axis.

3. A laser processing machine as claimed in claim 1, further comprising:
at least one heat beam reflector arranged between said plurality of sensors and said conversion edge, said heat beam reflector redirecting the at least one secondary electromagnetic heat beam from its at least one propagation direction towards at least one of said plurality of sensors.

4. A laser processing machine as claimed in claim 1, further comprising:
said conversion edge in cross-section forms an angle of inclination in the range of 4° to 7° relative to a plane normal to said central axis.

5. A laser processing machine as claimed in claim 1, further comprising:
said conversion edge is located on an inner shell surface of said nozzle.

6. A laser processing machine as claimed in claim 1, further comprising:
said conversion edge includes plural non-contiguous conversion segments.

7. A laser processing machine as claimed in claim 1, further comprising:
said conversion edge has at least one of a (1) wear resistant coating, or, (2) a conversion-accelerating coating.

8. A laser processing machine as claimed in claim 1, further comprising:
each of said plurality of NIR heat radiation sensors has a respective holder that holds it and its at least one respective glass pane, each of said plurality of holders being fixed in a respective recess in said laser processing head.

9. A process for centering a primary focused laser beam comprising the steps of:
defining a X-Y coordinate plane normal to a nozzle axis;
providing a conversion edge in the interior of a nozzle;
converting long-wave IR of a primary focused laser beam to generate short-wave NIR of a secondary heat beam;
displacing the primary focused laser beam on the X-Y coordinate plane and transversely relative to a nozzle orifice, until the primary focused laser beam establishes incidence on the conversion edge;
radiating from the conversion edge, along at least one propagation direction, secondary heat radiation in the NIR range;
measuring values of the propagated heat radiation in the NIR range with heat radiation sensors;
assigning each measured value of heat radiation to associated X-Y coordinates of the nozzle axis and the primary focused laser beam;
calculating a position of a center of the nozzle orifice relative to the position of the primary focused laser beam by employing corresponding measured values obtained after plural repetitions of said step of displacing the primary focused laser beam; and,
based on said step of calculating, effecting an adjusting of the center of the nozzle orifice relative to the primary focused laser beam to center the laser beam.

10. The process for centering a primary focused laser beam as claimed in claim 9, wherein:

said step of displacing the primary focused laser beam on the X-Y coordinate plane and transversely relative to a nozzle orifice until the primary focused laser beam establishes incidence on the conversion edge, is performed in three or more directions on the X-Y coordinate plane.

11. A process for centering a primary focused laser beam as claimed in claim 9, further comprising the steps of:
   determining heat beam maxima and an intermediate minimum for the heat beam by performing said step of displacing the primary focused laser beam on the X-Y coordinate plane and transversely relative to a nozzle orifice, until the primary focused laser beam establishes incidence on the conversion edge, from $X_{min}$ to $X_{max}$ and also from $Y_{min}$ to $Y_{max}$; and,
   centering by adjusting the X and Y coordinates of the center of the nozzle orifice to the X and Y coordinates of the heat beam minimum.

12. A process for centering a primary focused laser beam as claimed in claim 9, further comprising the step of:
   substituting the primary focused laser beam with a low-power directional beam.

13. The process for centering a primary focused laser beam as claimed in claim 9, wherein:
   said step of converting long-wave IR of a primary focused laser beam to generate short-wave NIR of a secondary heat beam includes converting $CO_2$ laser working beam containing wavelength of 10.6 μm, into secondary heat beam containing wavelengths of 1.0-2.2 μm and visible to InGaAs diode heat radiation sensors.

14. The process for centering a primary focused laser beam as claimed in claim 9, wherein:
   said step of converting long-wave IR of a primary focused laser beam to generate short-wave NIR of a secondary heat beam is effected at least in part by providing a coated glass pane in a line-of-sight of a heat radiation sensor.

15. A laser processing machine comprising:
   a laser processing head, said laser processing head having an interior, said interior having an interior wall, said interior wall being disposed about a central axis;
   a nozzle associated with said laser processing head, said nozzle having a nozzle orifice for a primary focused laser beam;
   a beam centering arrangement including a plurality of radiation sensors;
   a conversion edge provided in the area of said nozzle orifice to convert at incidence the primary laser beam into at least one secondary electromagnetic heat beam respectively directed along at least one propagation direction towards said plurality of sensors; and,
   said plurality of sensors being arranged to view through respective openings in said interior wall of said laser processing head.

16. A laser processing machine as claimed in claim 15, further comprising:
   said plurality of sensors being evenly distributed around a circumference of said interior wall; and,
   each of said respective view openings has a respective center, said plurality of respective view opening centers being arranged in a plane normal to said central axis.

17. A laser processing machine as claimed in claim 15, further comprising:
   at least one heat beam reflector arranged between said plurality of sensors and said conversion edge, said heat beam reflector redirecting the at least one secondary electromagnetic heat beam from its at least one propagation direction towards at least one of said plurality of sensors.

18. A laser processing machine as claimed in claim 15, further comprising:
   said conversion edge is located on an inner shell surface of said nozzle; and,
   said conversion edge in cross-section forms an angle of inclination in the range of 4° to 7° relative to a plane normal to said central axis.

19. A laser processing machine as claimed in claim 15, further comprising:
   said conversion edge includes plural non-contiguous conversion segments.

20. A laser processing machine as claimed in claim 15, further comprising:
   said conversion edge has at least one of a (1) wear resistant coating, or, (2) a conversion-accelerating coating.

* * * * *